US007955939B1

(12) United States Patent
Jiang (10) Patent No.: US 7,955,939 B1
(45) Date of Patent: Jun. 7, 2011

(54) METHOD FOR PRODUCING A HIGH CAPACITANCE CATHODE BY ANNEALING A METALLIC FOIL IN A NITROGEN ENVIRONMENT

(75) Inventor: Xiaofei Jiang, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 1230 days.

(21) Appl. No.: 11/470,417

(22) Filed: Sep. 6, 2006

(51) Int. Cl.
*H01L 21/331* (2006.01)

(52) U.S. Cl. ........................................ 438/339; 29/25.03

(58) Field of Classification Search .................. 29/25.03
See application file for complete search history.

(56) References Cited

U.S. PATENT DOCUMENTS

| | | | | |
|---|---|---|---|---|
| 3,465,426 A | * | 9/1969 | Baier et al. | 29/25.03 |
| 3,578,570 A | * | 5/1971 | Harvey | 205/50 |
| 5,547,518 A | * | 8/1996 | Johnson et al. | 148/98 |
| 5,822,177 A | * | 10/1998 | Popp et al. | 361/508 |
| 5,980,977 A | | 11/1999 | Deng et al. | |
| 7,715,174 B1 | * | 5/2010 | Beauvais et al. | 361/528 |

FOREIGN PATENT DOCUMENTS

WO 9814970 A1 4/1998

* cited by examiner

*Primary Examiner* — Jarrett J Stark
*Assistant Examiner* — Lawrence Tynes, Jr.
(74) *Attorney, Agent, or Firm* — Steven M. Mitchell (57) ABSTRACT

The present invention is a method for the production of a high capacitance foil for use as a cathode in an electrolytic capacitor by forming a nitride layer on at least one surface of the foil by annealing the foil at an elevated temperature in the presence of nitrogen gas ($N_2$). By this method, an enhanced foil surface area can be achieved. Since the double layer capacitance of a cathode is proportional to the effective surface area of the cathode, the annealing process increases the cathode capacitance such that it can be effectively used in a high-gain multiple stacked anode electrolytic capacitor. After production of the foil by said method, the foil is cut into a shape that is suitable for assembly in such an electrolytic capacitor, which is commonly used in an implantable cardiac defibrillator (ICD).

20 Claims, 5 Drawing Sheets

FIG. 7

METHOD FOR PRODUCING A HIGH CAPACITANCE CATHODE BY ANNEALING A METALLIC FOIL IN A NITROGEN ENVIRONMENT

BACKGROUND OF THE INVENTION

1. Field of the Invention

The present invention relates to a method for forming a nitride layer on at least one surface of a metallic foil substrate for use as a cathode in an electrolytic capacitor by annealing, which increases the surface area and capacitance of the metal foil.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in ICDs. In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, it has been necessary to stack up to seven anodes per layer. However, due to the higher capacitance values achieved with multiple anodes, traditional electrochemically etched aluminum cathodes provide insufficient capacitance coverage at the desired thickness of 30 microns or less.

Known cathode technologies either present significant problems or are difficult to obtain. Etched aluminum cathodes are technologically limited and can not support the high capacitance required when more than two anodes are placed adjacent to each other in a capacitor stack. Coated cathodes are difficult to obtain commercially and reliably. Also, known methods of titanium nitride coating are expensive. Metal oxides are difficult to coat in high purity without chloride contamination. Conductive polymers have exhibited stability issues under certain loads and uses. Therefore, there is a need for a cathode that provides suitable coverage to allow for a multiple anode stacked capacitor configuration with maximum energy output.

BRIEF SUMMARY OF THE INVENTION

An embodiment of the present invention is a method for the production of a nitride layer on at least one surface of a metallic foil substrate, the foil to be used as a cathode electrode in an electrolytic capacitor, comprising: placing the foil into an anneal furnace; heating the anneal furnace to an annealing temperature; and exposing the foil to a gas stream containing nitrogen gas ($N_2$), so that the nitrogen gas reacts with at least one surface of the foil to form a nitride layer on at least one surface of the foil.

Another embodiment is a method for the production of a nitride layer on at least one surface of an uncoated metallic foil substrate, the foil to be used as a cathode electrode in an electrolytic capacitor, comprising: placing the uncoated foil into an anneal furnace; heating the anneal furnace to an annealing temperature between 600° F. and 1450° F.; and exposing the uncoated foil to a gas stream containing nitrogen gas ($N_2$), so that the nitrogen gas reacts with at least one surface of the uncoated foil to form a nitride layer on at least one surface of the coated foil.

Another embodiment is a method for preparing a metal foil for use as a cathode electrode in an electrolytic capacitor, comprising: placing the foil into an anneal furnace; heating the anneal furnace to an annealing temperature between 600° F. and 1450° F.; exposing the foil to a gas stream containing a mixture of nitrogen gas ($N_2$) and argon gas, wherein the nitrogen gas reacts with at least one surface of the foil to form a nitride layer on at least one surface of the foil; removing the foil from the anneal furnace; and cutting the foil into one or more shapes suitable for use as a cathode electrode in an electrolytic capacitor.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention is directed to a method for forming a nitride layer onto at least one surface of a metallic foil substrate in order to enhance the surface area and capacitance of the foil when used as a cathode in an electrolytic capacitor comprising a high-temperature annealing step in an environment containing nitrogen gas ($N_2$). According to the present invention, the capacitance of the foil at the desired cathode thickness (30 microns or less) increases from between 10 $\mu F/cm^2$ and 20 $\mu F/cm^2$ to greater than 20 $\mu F/cm^2$. This enhanced double layer capacitance, coupled with the enhanced pseudocapacitance resulting from the electrochemical reactions on the surface of the foil between the electrolyte and the nitride layer provide an adequate cathode capacitance for use in an electrolytic capacitor with a multiple anode flat, stacked configuration, which is common in Implantable Cardioverter Defibrillators (ICD). Compared to other known processes that are used to increase the surface area of foil substrates in order to increase foil capacitance, this annealing method is faster, cheaper, and less energy-intensive method. Use of this method allows for the inexpensive production of metal foil for use as cathodes in electrolytic capacitors in small-volume applications, such as ICDs.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

It is well understood that in order to achieve high total capacitance and maximum anode gain realization for capacitors with high-gain anodes, such as those used in ICDs, the cathode capacitance must be nearly two orders of magnitude higher than the anode capacitance that it opposes. The cathode in an electrolytic capacitor must exhibit much higher capacitance than the anode because the cathode capacitance appears in series with the anode capacitance to yield the total capacitance. Furthermore, most electrolytic capacitors are polar; that is, the capacitors must be connected with the correct polarity such that the cathode has a negative potential. If the cathode capacitance is much larger than the anode capacitance, the cathode electrode maintains a negative potential, and the risk of a reverse voltage is minimal. However, if the cathode capacitance is not much larger than the anode capacitance, the cathode electrode can develop a positive potential during discharge of the capacitor. If the cathode develops a positive potential, several undesirable effects can occur. Therefore, to minimize the likelihood of these adverse effects on cathode performance and allow for use in electrolytic capacitors in ICDs, a high capacitance cathode foil that occupies a relatively small thickness (volume) is desired.

Whenever an electrode is placed in contact with an electrolyte, a capacitance is developed at the interface. For an electrolytic capacitor with both the anode and cathode immersed in the fill electrolyte, the cathode acquires a capacitance in series with the anode. From the well understood formula (where Cf=Final capacitance, Ca=Anode capacitance, and Cc=Cathode capacitance):

$$Cf = \frac{Ca \cdot Cc}{Ca + Cc}$$

In order to realize 100% of the anode capacitance, the cathode capacitance must appear infinite. As this is unrealistic, the highest possible cathode capacitance is desired. Thickness is also an issue in ICDs as in other applications where space is a critical design element, so high cathode capacitance must not be achieved at the expense of an overly thick cathode. With this in mind, a 30 micron cathode with a capacitance of 170 $\mu F/cm^2$ to 200 $\mu F/cm^2$ has been employed for designs involving a dual anode configuration. For a specific anode capacitance of 2.6 $\mu F/cm^2$ for the two anodes together, a cathode capacitance of 200 $\mu F/cm^2$ leaves a realized capacitance of nearly 99% of the anode.

The advent of porous foil has allowed additional anodes to be stacked in place. With five anodes in place per layer and a conventional 30 micron cathode, the realized capacitance from the anode would be about 97%. However, there is a more insidious problem than simple capacitance loss due to the low capacitance of conventional cathodes.

In an electrolytic capacitor, the anode exhibits a dielectric capacitance capable of holding several hundred volts. The cathode exhibits a native oxide layer in series with a double layer capacitance capable of holding a maximum of approximately three volts, and typically under 1.0 volt. The anode capacitance and the cathode capacitance are in series. When a charged electrolytic capacitor pumps current through a resistive load, the anode dielectric capacitance can be visualized as discharging towards a ground potential; and the cathode double layer capacitance can be visualized as charging from a negative potential to a more positive potential.

During discharge, the charge passed by the anode to the load must be equaled by the charge passed at the cathode. If this becomes unbalanced during discharge, the cathode potential will be shifted positively. If the cathode develops a positive potential, several undesirable effects can occur: (1) during a pulse discharge operation, a significant overvoltage can be fed back to the cathode, resulting in oxide buildup on the cathode which reduces the capacitor performance, (2) electrolysis can occur that consumes electrolyte and deteriorates the performance of the capacitor with usage, and (3) gaseous electrolysis byproducts can cause swelling of the capacitor.

When the capacitor is charged, positive charge accumulates on the anode foil and negative charge on the cathode foil. When held at potential for an appreciable time, the cathode will self discharge (or depolarize, in electrochemical terms) to some extent due to the fact that valve metal oxides are conductive in the reverse direction. This discharge of the cathode must involve reduction of some electrolyte species such as dissolved oxygen, depolarizer molecules, solvent or solute species or reduction of water to liberate hydrogen gas and hydroxyl/oxygen ions. It is this latter case where hydrogen is evolved that causes swelling in electrolytic capacitors undergoing repeated charge/discharge cycles.

When the capacitor is discharged quickly through an external load, electrons are attracted to the anode from the cathode through the external circuit. If the cathode capacitance-voltage (CV) product is lower than the anode CV product, insufficient charge storage capacity on the cathode results in a momentary positive bias of the cathode with respect to the electrolyte, leading to oxidation at the cathode surface. Little occurs at the anode foil surface since the field there is reduced to zero. If the metal can be oxidized easily, then anodic oxide is formed on the cathode foil as in the case of aluminum. If not, then an electrolyte component will be oxidized instead to liberate the electrons needed to reduce the electric field across the electrolyte-cathode interface to a level sustainable by the Helmholtz or double layer.

Since a reverse voltage drop at the cathode in excess of about one volt results in cathode formation and hydrogen gas production, this undesirable condition determines the condition for the minimum acceptable ratio of cathode to anode capacitance. With the advent of 4 and 5 anode per layer stacks having a capacitance of about 5 to 6 $\mu F/cm^2$, conventional aluminum or titanium cathodes are unable to provide the high capacitance needed in a 30 micron or thinner foil.

One way to increase the cathode capacitance without increasing cathode thickness is to increase the effective cathode surface area by increasing the ratio of microscopic to macroscopic surface area, which is called the foil gain. The foil gain is defined as the capacitance per unit macroscopic area of a surface-enhanced foil divided by the capacitance per unit area of the non-surface-enhanced foil. Increased cathode surface area increases the cathode double layer capacitance without augmenting cathode thickness. The increase of cathode capacitance while maintaining a thin cathode thickness allows the cathode to support a high-gain aluminum anode foil and minimize the risk of reversed cathode potential, electrolysis reaction gas evolution, capacitor swelling, and oxide buildup on the cathode. As such, in the field of electrolytic capacitors, high capacitance, thin foil cathodes are generally obtained by using thin surface area-enhanced foil with minimum oxide present.

In order to increase the foil surface area, it is known to use aluminum foil as the cathode in which the foil has been subjected to an electrochemical etching process. Electrochemical etching roughens the surface of the foil, causing hollow tunnels to grow into the aluminum foil. The etching process greatly increases the microscopic to macroscopic surface area ratio. Although etching increases cathode surface area and capacitance, conventional hydrochloric acid (HCl)-etched aluminum cathodes with a 30 micron or thinner foil, which is the ideal thickness in ICD electrolytic capacitors, do not provide an adequate anode-to-cathode capacitance ratio for full 120 hertz (Hz) capacitance realization in a multiple anode flat, stacked capacitor configuration. Therefore, at 30 microns, an etched aluminum foil cannot support the high capacitance requirement when two or more anodes are adjacently placed in a capacitor stack, as is the typical ICD electrolytic capacitor configuration. As such, in order to realize the anode foil capacitance, a high capacitance cathode foil formed through another method is needed.

An alternative to etching is deposition of a layer of a different material onto the foil substrate. It is known to coat high surface materials on metal foil substrates, such as titanium nitride on aluminum, metal oxides on titanium, or conductive polymers on a variety of metals including aluminum and titanium. For example, titanium nitride ($TiN_x$), which is an important coating material due to its chemical stability, mechanical properties, and corrosion resistance, has been used as a surface area-enhancing diffusion barrier on non-titanium substrates in semiconductor technology. In titanium nitride, nitrogen (N) atoms fit into the gaps of the titanium (Ti) structure and occupy the octahedral sites of the Ti lattice as reported by Rocha et al. in "Structural and corrosion behavior of stoichiometric and substoichiometric TiN thin films," L. A. Rocha et al., *Surface and Coatings Technology* 180-181, pp. 158-163 (2004). Deposition processes to coat high surface area materials onto metal foil substrates, such as chemical vapor deposition (CVD) or physical vapor deposition (PVD), also known as atomic layer deposition (ALD), have been used to increase surface area and deposit layers, such as titanium nitride ($TiN_x$) onto aluminum foil or metal oxides, such as aluminum oxide, onto titanium foil. However, these technologies are costly, consume much energy, and generate chemical waste.

Accordingly, disclosed herein is a high temperature annealing process that may be used as an alternative to conventional etching or deposition processes for the formation of a conductive surface layer on a foil substrate. Annealing is a process whereby a metal is heated at high temperature in order to increase a metal's strength and hardness by removing crystal defects and the internal stresses caused by these defects. Annealing is typically used as one of the last steps in materials processing. Use of annealing to form a layer on a solid substrate is often referred to as reactive growth. In this process, a surface reaction between solid foil molecules and ambient gas molecules, such as oxygen ($O_2$), hydrogen ($H_2$), or nitrogen ($N_2$), occurs. As a result of the surface reaction, an oxide, hydride, nitride, or other layer is formed on the surface of the foil. In addition to obviating waste generation, the annealing process is typically less expensive and energy-intensive than other methods used to enhance the surface area of solid substrates. Therefore, an annealing method with low manufacturing costs that is able to produce a high-surface area cathode with adequate, increased capacitance for use in an electrolytic capacitor in a multiple anode stack configuration, as in an ICD, is desired.

Furthermore, research conducted by the assignee of the present invention has shown that the functionality of titanium foil as the cathode in an electrolytic capacitor is dependent on the electrochemical reactions of the cathode with the electrolyte in the capacitor (e.g., oxidation of titanium to titanium dioxide ($TiO_2$) and the oxidation of electrolyte). The electrochemical reactions act like a high pseudocapacitance and, along with the inherent double layer capacitance, comprise the total capacitance of the cathode. The existence of the pseudocapacitance allows the realization of the full capacitance of the anode foil as they provide a current path to charge and discharge the anode foil, where the majority of the ICD capacitor energy is stored, and the full discharge energy can be delivered. The currents of these reactions are increased with surface area and with the introduction of nitrogen atoms onto the surface of the foil. Therefore, in addition to providing a larger range of current densities, a titanium foil with a titanium nitride layer formed thereon with an enhanced surface area would have a sufficiently high capacitance (enhanced pseudocapacitance and enhanced double layer capacitance) to support a high-gain aluminum anode foil.

Figure 1:
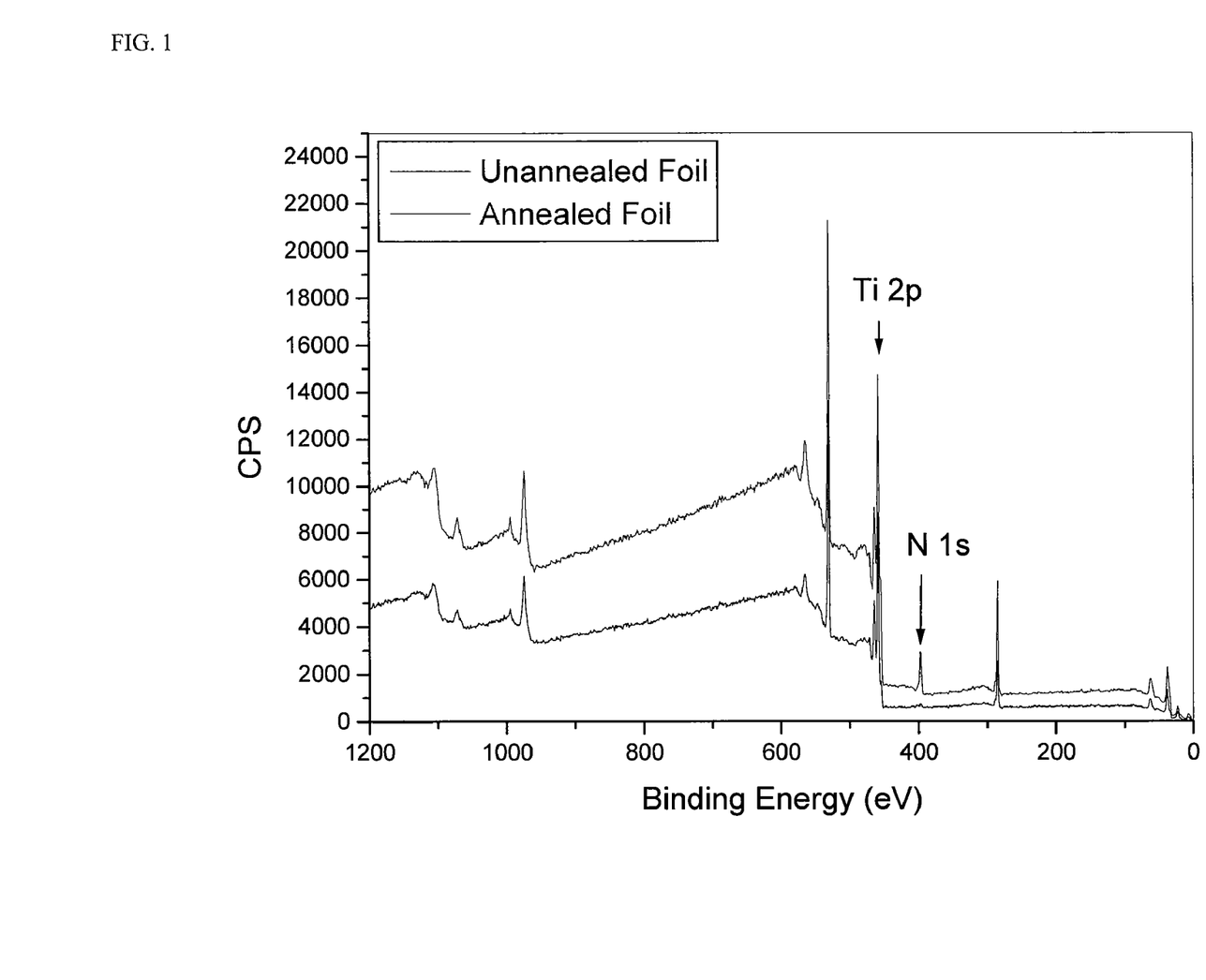
FIG. 1 is a plot of the XPS (X-ray photoelectron spectroscopy) results comparing a foil without a nitride layer (unannealed foil) and a foil with a nitride layer (annealed foil).

Accordingly, a metallic nitride layer is formed on a metal or metallic alloy foil substrate by placing the foil in an annealing furnace, such as a quartz tube furnace, continuously purging the furnace with gas that contains nitrogen gas ($N_2$), and annealing the foil at high temperature in the presence of nitrogen gas. The foil is selected from a group of metals and metallic alloys consisting of Plain Grade 1 titanium (Ti), Plain Grade 2 titanium, aluminum (Al), palladium (Pd), lead (Pb), nickel (Ni), tin (Sn), platinum (Pt), silver (Ag), gold (Au), zirconium, (Zr), molybdenum (Mb), tantalum (Ta), palladium-silver alloy, platinum-rhodium (Rh) alloy, platinum-ruthenium (Ru) alloy, and platinum-iridium (Ir) alloy. Considering only titanium and aluminum, which are the two most common foils used in electrolytic capacitor cathode manufacturing, titanium foil is preferred as titanium has a greater inherent capacitance and superior cathode performance. If titanium foil is used, Plain Grade 2 titanium foil is preferred over Plain Grade 1 titanium foil. XPS (X-ray photoelectron spectrometry) measurements taken before and after the treatment of a titanium foil indicated the presence of a nitride layer formed on the titanium foil as illustrated in FIG. 1 with the label N 1s.

It is preferable that the foil be uncoated when placed into the anneal furnace. Uncoated is intended to mean that no additional layers have been coated onto the foil.

The foil has a thickness between 5 microns and 110 microns before annealing. Preferably, the foil thickness before annealing is between 10 microns and 30 microns. The annealing process does not significantly change the foil thickness, so annealed foil thicknesses would have similar ranges.

The temperature in the anneal furnace during the annealing, known as the annealing temperature, ranges between 300° F. and 1500° F. Preferably, the annealing temperature ranges between 600° F. and 1450° F. The foil can be placed into the anneal furnace before the temperature in the anneal furnace is increased from ambient conditions to the annealing temperature. Alternatively, the foil can be placed into the anneal furnace after the temperature in the anneal furnace reaches the anneal temperature.

In order to form a metal nitride layer on the foil substrate, nitrogen gas ($N_2$) is introduced into the anneal furnace. Pure nitrogen gas (100% $N_2$ by volume) can be used. Alternatively, a mixture of nitrogen gas and an inert gas can be used (nitrogen-inert gas mixture). The inert gas may be selected from the group consisting of argon (Ar), neon (Ne), or helium (He). Preferably, argon is used in the nitrogen-inert gas mixture. If a nitrogen-inert gas mixture is used, the percentage of nitrogen gas on a volumetric basis is between 0.1 and 100%. Preferably, the nitrogen content of the nitrogen-inert gas mixture ranges from 10 and 50% on a volumetric basis. The desired ratio of the two gases (nitrogen to inert gas) is maintained by adjusting their respective gas flow rates. The two gases can be mixed together upstream of the anneal furnace at the confluence of two separate gas flow lines. Alternatively, the two gases can be mixed together at the entrance of the anneal furnace such that two separate gas flow lines feed directly into and purge the anneal furnace. Preferably, the gas or gases are introduced into the anneal furnace to purge the anneal furnace of oxygen prior to placing the foil inside the furnace in order to avoid oxide formation on the surface of the foil.

The duration of the anneal process is the total amount of time that the foil is exposed to nitrogen at the anneal temperature. The total duration of the anneal process is between 1 minute and 60 minutes, preferably between 1 minute and 10 minutes. Upon completion of the anneal process, the annealed foil will have a titanium nitride layer on at least one side of the foil. The foil will have an enhanced surface area, namely, an increased microscopic to macroscopic surface area ratio, and an increased foil gain, which is defined as the capacitance per unit macroscopic area of the annealed foil divided by the capacitance per unit area of the unannealed foil. The double layer capacitance of the annealed titanium foil electrode will be greater than 20 ($\mu F/cm^2$). Furthermore, the reactions between the titanium nitride layer and an electrolyte provides for an enhanced pseudocapacitance.

In addition to the aforementioned sequence of first placing the foil into an anneal furnace at ambient temperature and pressure, followed by heating the anneal furnace to the anneal temperature, purging the anneal furnace with nitrogen or a nitrogen-inert gas mixture, and removing the annealed foil, other annealing sequences can be used. For example, prior to placing the foil into the anneal furnace, the furnace can be heated to the anneal temperature. Thereafter, the foil is placed in the furnace, which subsequently is purged with nitrogen or a nitrogen-inert gas mixture. Lastly, after annealing, the foil is removed from the anneal furnace. Alternatively, the foil can be placed in the anneal furnace at ambient temperature and pressure. Thereafter, the anneal furnace can be purged with nitrogen or a nitrogen-inert gas mixture, followed by heating the anneal furnace to the anneal temperature, with the foil removed from the furnace after the annealing process. Alternatively, prior to placing the foil in the anneal furnace, the furnace can be purged with nitrogen or a nitrogen-inert gas mixture. Thereafter, the furnace is heated to the anneal temperature. When the anneal temperature is reached, the foil is placed inside the anneal furnace, and removed after the annealing process.

The foil is removed from the anneal furnace after the temperature in the anneal oven has returned to ambient conditions (room temperature). After removal from the anneal furnace, the annealed titanium foil is cut into a shape suitable for assembly in an electrolytic capacitor and serves as the cathode. The foil may be cut in nearly any shape, to fit within a similarly shaped capacitor housing, as would be apparent to those skilled in the art. For example, circular, half-circle, square, rectangular, triangular and the like shapes may be used. Alternatively, prior to cutting into a suitable shape, the foil can be rinsed with methanol ($CH_3OH$), water, or any mixture thereof. Alternatively, after the rinse, the foil can be air-dried. The foil is then interleaved as a cathode between three or more high surface area anode foils.

A paper separator or other fiber with sufficient thickness and density, such as Kraft paper, manila, esparto or hemp, is used to prevent electrical contact between the anode and cathode. Also, different porous polymer sheets, such as porous polypropylene, could be used as well as ion conducting polymers to prevent electrical contact between the anode and cathode. An electrolytic capacitor stack according to the present invention consists of a number of units of: a cathode, a spacer, two or more anodes, a spacer and a cathode; with neighboring units sharing the cathode between them.

The preassembled capacitor is then vacuum impregnated with an electrically conductive electrolyte, by placing the capacitor in contact with the electrolyte and reducing the pressure to less than 50 mm Hg. The capacitor electrolyte is typically ethylene glycol based with a straight chain dicarboxlyic acid and/or boric acid, such as the electrolytes disclosed in U.S. Pat. Nos. 6,562,255 and 6,589,441, incorporated herein by reference. The electrolyte is neutralized with ammonia or an amine. A cathode depolarizer, typically a nitroaromatic compound such as nitrobenzene, nitroacetophenome, or nitroanisole, may be added to the electrolyte to improve the gas evolution behavior of the cathode, preferably and addition of 1% to 3% by weight cathode depolarizer. The capacitor is held at this low pressure for 5 to 45 minutes and then pressure is restored, using the pressure to force the electrolyte into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

The present invention has application for the large-scale production of foil with a nitride layer formed thereon, which can be used to comprise a cathode by cutting a treated foil into pieces having a shape suitable for use as a cathode in a flat electrolytic capacitor. The cut cathodes can be used in forming a flat electrolytic capacitor by interleaving the cathodes between poly-anode stacks (having two or more adjacent anodes) such that two poly-anode stacks share one cathode; placing separator materials between the cathodes and poly-anode stacks; and impregnating the flat capacitor with an electrically conductive electrolyte. The resulting flat electrolytic capacitor consists of a number of units consisting of a cathode, a separator material, two or more anodes, a separator material and a cathode, with neighboring units sharing the cathode between them.

Electrolytic capacitors incorporating cathodes comprised of foil produced by the present invention can be incorporated into implantable medical devices, such as implantable cardioverter defibrillators (ICDs). The nitride layer provides enhanced double layer capacitance and pseudocapacitance so that the thin, small volume foil cathode has adequate capacitance to be used in an ICD. The annealed foil has higher total capacitance than an unannealed foil or traditional chemically etched aluminum foil, which results in better performance as a cathode in high energy density electrolytic capacitor.

As noted above, the increased surface area foil produced by the present invention makes it possible to use thin cathodes, thereby reducing the physical dimensions of the electrolytic capacitor. When used as a cathode, foil produced by the present invention enables the cathode capacitance to remain much larger than the anode dielectric capacitance, preventing the cathode electrode from developing a positive potential, especially in multiple anode stack configuration constructions. This prevents the occurrence of electrolysis reactions, where water and other compounds are reduced in part to hydrogen gas ($H_2$), which results capacitor swelling. Furthermore, maintaining a negative cathode potential reduces oxide buildup on the cathode and deteriorated capacitor performance. In addition, the present invention is less energy intensive, wasteful, and costly than other surface area enhancing methods, such as film deposition or electrochemical etching.

Having now generally described the invention, the same will be more readily understood through reference to the following example. The following example is illustrative, but not limiting, of the method of the present invention. Other suitable modifications and adaptations of the variety of conditions and parameters normally encountered and obvious to those skilled in the are within the spirit and scope of the invention.

EXAMPLES

The following are two examples of foil produced by the present invention.

Example 1

Figure 2:
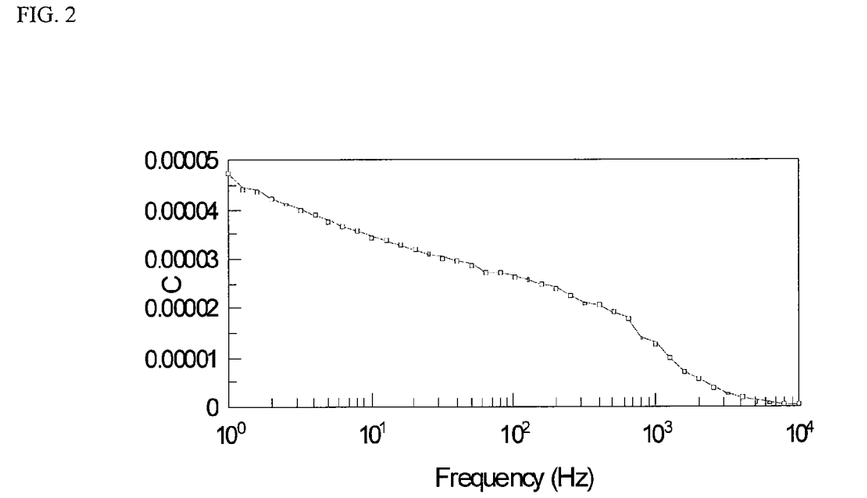
FIG. 2 is a plot of the double layer capacitance of a titanium foil treated according to Example 1.
Figure 3:
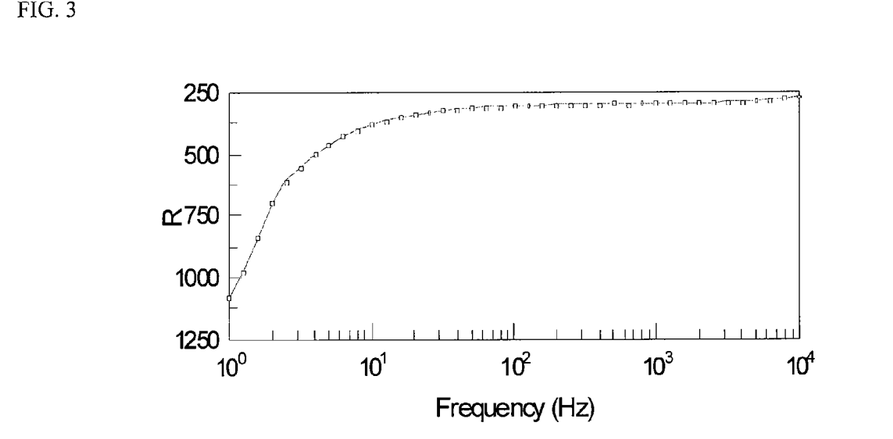
FIG. 3 is a plot of the ESR (equivalent series resistance) of a titanium foil treated according to Example 1.
Figure 4:
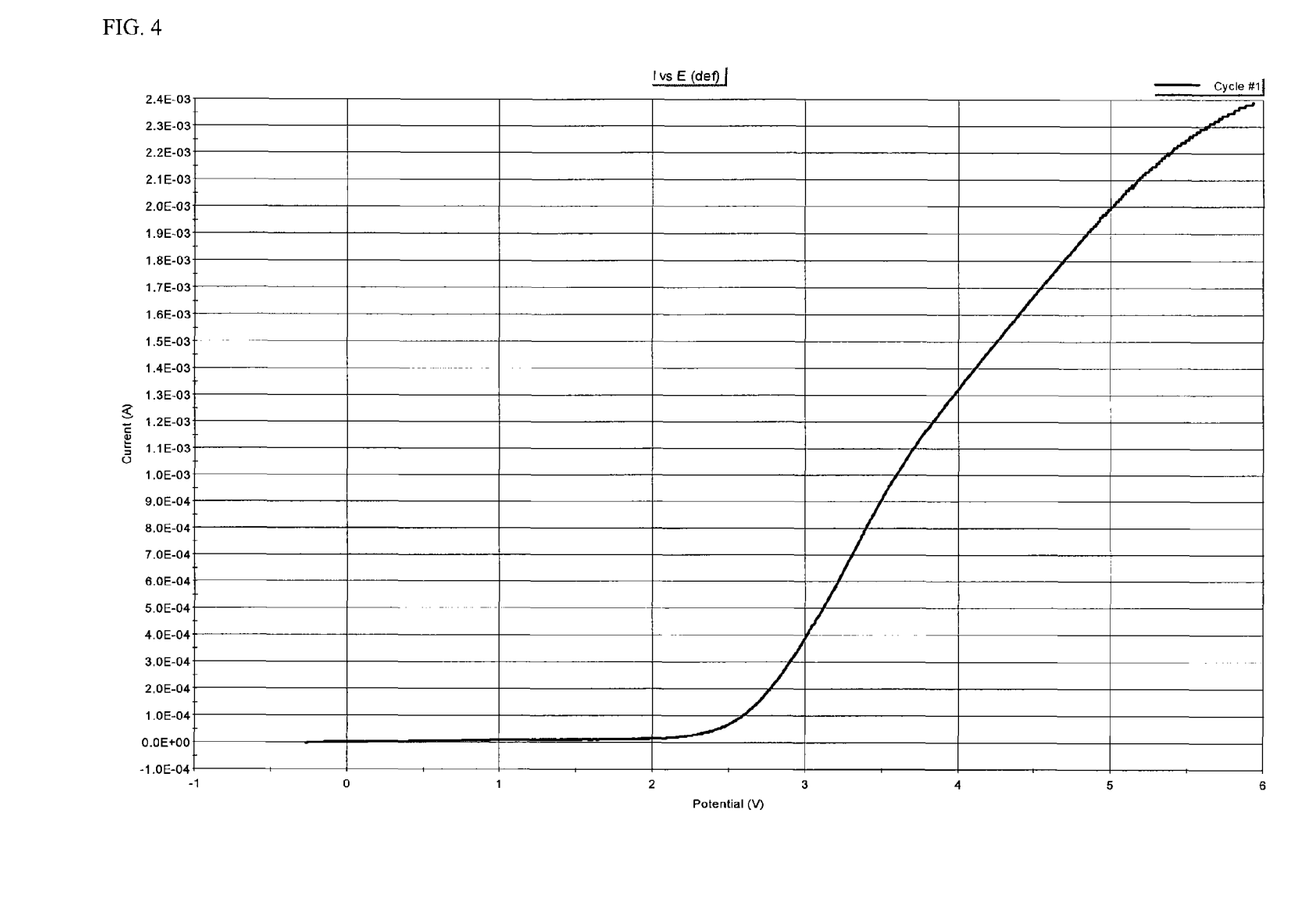
FIG. 4 is a CV (cyclic voltammetry) scan curve of a titanium foil treated according to Example 1.

The double layer capacitance of a plain grade titanium 2 foil was measured at 10 $\mu F/cm^2$. After measuring the capacitance, the foil was placed inside a quartz tube oven (anneal furnace) purged with nitrogen gas (100% $N_2$) and heated to anneal temperature of 600° C. The foil was exposed to nitrogen gas at this elevated temperature for a total of ten (10) minutes. Thereafter, the foil was removed. XPS (X-ray photoelectron spectrometry) measurements indicated the presence of a nitride layer formed on the titanium foil. The double layer capacitance of the annealed titanium foil with the titanium nitride layer formed thereon was 30 $\mu F/cm^2$. FIG. 2 is a plot of the double layer capacitance of the treated titanium foil. ESR (equivalent series resistance) measurements were also taken of the treated titanium foil and are shown in FIG. 3. Furthermore, the CV (capacitance-voltage) scan had a high current after 2.5 Volts (V), reaching 3 milliamperes (mA) at 4 V as shown in FIG. 4. Based on this double layer capacitance, if used as a cathode, the total capacitance of the foil (double layer capacitance and pseudocapacitance) is anticipated to be in a range sufficient to support a high-gain anode electrolytic capacitor.

Example 2

Figure 5:
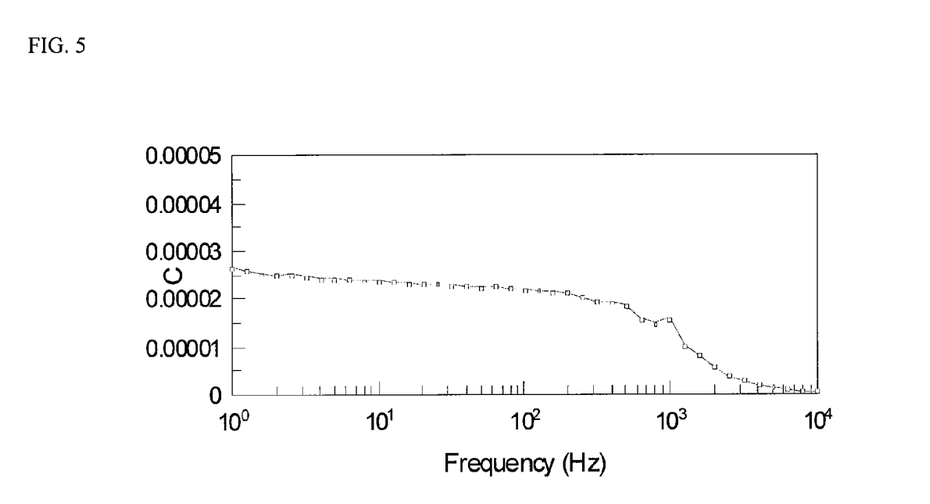
FIG. 5 is a plot of the double layer capacitance of a titanium foil treated according to Example 2.
Figure 6:
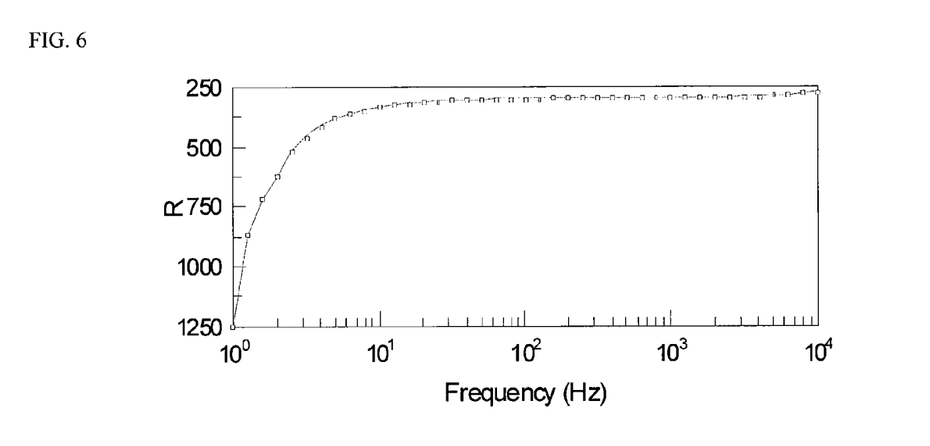
FIG. 6 is a plot of the ESR of a titanium foil treated according to Example 2.
Figure 7:
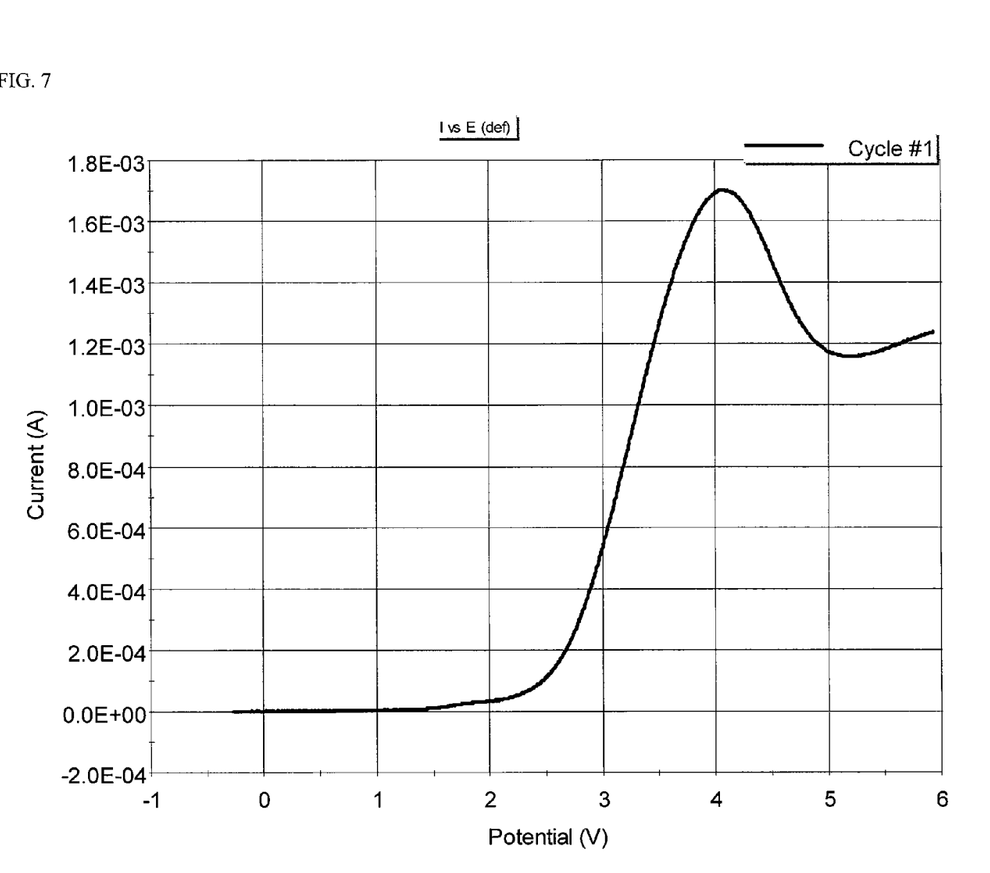
FIG. 7 is a CV scan curve of a titanium foil treated according to Example 2.

The double layer capacitance of a plain grade titanium 2 foil was measured at 10 $\mu F/cm^2$. After measuring the capacitance, the foil was placed inside a quartz tube oven (anneal furnace) purged with nitrogen gas (100% $N_2$) and heated to anneal temperature of 500° C. The foil was exposed to nitrogen gas at this elevated temperature for a total of two (2) minutes. Thereafter, the foil was removed. XPS (X-ray photoelectron spectrometry) measurements indicated the presence of a nitride layer formed on the titanium foil. The double layer capacitance of the annealed titanium foil with the titanium nitride layer formed thereon was 25 $\mu F/cm^2$. FIG. 5 is a plot of the double layer capacitance of the treated titanium foil. ESR (equivalent series resistance) measurements were also taken of the treated titanium foil and are shown in FIG. 6. Furthermore, the CV (cyclic voltammetry) scan had a high current after 2 V, reaching 1.7 mA at 4 V as shown in FIG. 7. Based on this double layer capacitance, if used as a cathode, the total capacitance of the foil (double layer capacitance and pseudocapacitance) is anticipated to be in a range sufficient to support a high-gain anode electrolytic capacitor.

While various embodiments have been described above, it should be understood that they have been presented by way of example only, and not limitation. Thus, the breadth and scope of this disclosure should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the embodiments that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for the production of a nitride layer on at least one surface of a titanium foil, said foil to be used as a cathode electrode in an electrolytic capacitor, comprising:
   (a) placing said foil into an anneal furnace;
   (b) heating said anneal furnace to an annealing temperature; and
   (c) exposing said foil to a gas stream containing nitrogen gas ($N_2$), wherein said nitrogen gas reacts with at least one surface of said foil to form a nitride layer on at least one surface of said foil, wherein the nitride layer increases a capacitance of the foil to greater than 20 $\mu F/cm^2$.

2. The method of claim 1, further comprising:
   (d) rinsing said foil with methanol ($CH_3OH$), water, or any mixture thereof.

3. The method of claim 2, further comprising:
   (e) drying said foil.

4. The method of claim 3, further comprising:
   (f) cutting said foil into a shape suitable for assembly as a cathode electrode in an electrolytic capacitor.

5. The method of claim 1, wherein step (c) comprises purging the anneal furnace with the gas stream and wherein step (c) is performed before step (b).

6. The method of claim 5, wherein step (b) is performed before step (a).

7. The method of claim 1, wherein step (b) is performed before step (a).

8. The method of claim 1, wherein said foil is selected from the group consisting of Plain Grade 1 titanium and Plain Grade 2 titanium.

9. The method of claim 1, wherein said foil has a thickness between 5 and 110 microns.

10. The method of claim 1, wherein said gas stream is 100% nitrogen gas measured on a volumetric basis fed directly into said anneal furnace.

11. The method of claim 1, wherein said gas stream is a mixture of two gases, said mixture comprising nitrogen gas and an inert gas, wherein said nitrogen gas is about 0.1% to less than about 100% of the total gas on a volumetric basis, and the balance of said gas stream is said inert gas.

12. The method of claim 11, wherein said nitrogen gas is fed into said anneal furnace separately from said inert gas.

13. The method of claim 11, wherein said nitrogen gas is mixed with said inert gas before being fed to said anneal furnace such that a nitrogen-inert gas mixture is fed to said anneal furnace.

14. The method of claim 11, where said inert gas is selected from the group consisting of argon, neon, helium, and mixtures thereof.

15. The method of claim 1, wherein said foil is exposed to said nitrogen gas at said annealing temperature in said anneal furnace between 1 minute and 60 minutes.

16. The method of claim 1, wherein said annealing temperature is between 600° F. and 1450° F.

17. The method of claim 1, wherein said annealing temperature is between 300° F. and 1500° F.

18. A method for the production of a nitride layer on at least one surface of an uncoated titanium foil substrate, said foil to be used as a cathode electrode in an electrolytic capacitor, comprising the steps of:
   (a) placing said uncoated foil into an anneal furnace;
   (b) heating said anneal furnace to an annealing temperature between 600° F. and 1450° F.; and
   (c) exposing said uncoated foil to a gas stream containing nitrogen gas, wherein said nitrogen gas reacts with at least one surface of said uncoated foil to form a nitride layer on at least one surface of said uncoated foil, wherein the nitride layer increases a capacitance of the foil to greater than 20 $\mu F/cm^2$.

19. The method of claim 18, wherein said uncoated foil is Plain Grade 1 titanium or Plain Grade 2 titanium.

20. A method of preparing a titanium foil for use as a cathode electrode in an electrolytic capacitor, comprising:
   (a) placing said foil into an anneal furnace;
   (b) heating said anneal furnace to an annealing temperature between 600° F. and 1450° F.;
   (c) exposing said foil to a gas stream containing a mixture of nitrogen gas ($N_2$) and argon gas, wherein said nitrogen gas reacts with at least one surface of said foil to form a nitride layer on at least one surface of said foil, wherein the nitride layer increases a capacitance of the foil to greater than 20 $\mu F/cm^2$;
   (d) removing said foil from said anneal furnace; and
   (e) cutting said foil into one or more shapes suitable for use as a cathode electrode in an electrolytic capacitor.

* * * * *